United States Patent [19]

Ten Broeck et al.

[11] 3,907,734

[45] Sept. 23, 1975

[54] METHOD OF PRODUCING POWDERED POLYMERS

[75] Inventors: Theodore R. Ten Broeck, Hudson; Raymond E. Downey, Copley, both of Ohio

[73] Assignee: The Goodyear Tire & Rubber Company, Akron, Ohio

[22] Filed: Apr. 11, 1973

[21] Appl. No.: 350,236

[52] U.S. Cl...... 260/23.7 M; 260/42.15; 260/42.55; 260/819
[51] Int. Cl.² .......................................... C08L 91/00
[58] Field of Search ............ 260/23.7 M, 41 A, 819, 260/41.5 R, 42.15, 42.55

[56] References Cited
UNITED STATES PATENTS

| | | | |
|---|---|---|---|
| 2,597,892 | 7/1950 | Iler | 260/41 A |
| 3,317,446 | 3/1967 | Wilder | 260/23.7 M |
| 3,663,655 | 5/1972 | Sturt | 260/23.7 M |
| 3,700,619 | 10/1972 | Burke | 260/41 A |

*Primary Examiner*—Melvyn I. Marquis
*Attorney, Agent, or Firm*—F. W. Brunner; J. D. Wolfe

[57] ABSTRACT

A method of making free-flowing powder from oil and water emulsions by mixing the oil and water emulsion into a partitioning agent containing hydrophobic silica, drying the particulate composition to obtain a powdery plastic or elastomeric composition and in a special embodiment removing at least part of the hydrophobic silica and reusing it to treat further oil and water emulsions.

9 Claims, No Drawings

METHOD OF PRODUCING POWDERED POLYMERS

This invention relates to a method of making a dry, free-flowing powder and to said powder. More particularly, this invention relates to a method of making a free-flowing powder from an emulsion of an elastomer or plastic, hereinafter sometimes referred to generically as rubber hydrocarbon.

In the polymerization of various olefin monomers to plastics or elastomers the polymerization is carried out in a water emulsion and it is necessary to recover the plastic or elastomer from the water emulsion by coagulating the emulsion. It has been the goal of those working with plastic and elastomer emulsions to break the emulsion and recover the plastic or elastomer as a free-flowing crumb to be stored as very fine particles without experiencing appreciable compacting on storage. The drying of the crumb to remove the water has required extensive equipment and also very meticulous handling of the crumb to prevent it from scorching or sticking together in large globs.

By this invention is provided a method for recovering the so-called "oil phase" from emulsion or dispersion as a free-flowing particle, drying the particles to obtain the particles in an essentially nonadhesive condition. Likewise this method provides for treating a so-called oil-in-water emulsion or dispersion to obtain a free-flowing solid particle and recovering at least part of the treating agent, preferably 50 percent and more preferably over 90 percent, for reuse in treating more oil-in-water dispersion.

In accordance with one embodiment of this invention, five parts and a sufficient amount of partition-agent containing hydrophobic silicon dioxide has added thereto with agitation the so-called oil-in-water emulsion where the so-called oil phase is preferably 35 to 55percent to convert the emulsion into a free-flowing particulate composition, and then the water is removed by drying the particulate composition to obtain the finely divided or powdery plastic or elastomeric composition. Since the hydrophobic fumed silicon dioxide is relatively expensive, in a preferred embodiment it is desirable to use a blend of the hydrophobic fumed silicon dioxide and precipitated fine particle silica (silicon dioxide) as the partition agent and recover at least part of the hydrophobic fumed silica from the powdery plastic or elastomeric composition.

The hydrophobic fumed silica can be readily recovered from the dry powdery plastic or elastomeric composition by screening or gaseous flotation. The dry powdery plastic or elastomeric composition is left with a discrete coating of the cheaper fine particle precipitated silica.

Any of the customary so-called oil-in-water emulsion or dispersion where the so-called "oil" of the oil phase is a solid over the temperature range of 20° to 50°C. can be used to practice this invention. Representative examples of these emulsions or dispersions are natural rubber latex, synthetic latex obtained by water emulsion polymerization of olefins of 2 to 20 carbon atoms either of the monoolefins or diolefins alone or in mixtures with each other. The preferred monoolefins are ethylene, propylene, butylene, and the preferred diolefins are butadiene, isoprene and higher alkyl butadienes where the alkyl radical contains from 1 to 10 carbon atoms, and acrylonitrile, styrene, vinyl chloride amylene and vinylidene chloride.

Representative synthetic latices are butadiene-styrene, butadiene-acrylonitrile, polybutadiene and polyisoprene. Usually these latices are obtained by polymerization at 20 to 35 percent solids, higher solid concentration latices can be obtained by use of special polymerization techniques or by concentration of the initially produced emulsion. Thus, in some cases it is desirable to produce latices having more than 35 percent solids up to 60 percent or more. Also, the latex that contains alkali soaps such as sodium or potassium of the fatty acids as the emulsifying agents are preferred in this process.

The nature of this invention and its various aspects can be more readily understood by reference to the following representative examples where all parts and percentages are by weight unless otherwise designated.

EXAMPLE I

Twenty-two hundred and seventy parts of a butadiene-styrene rubber latex of 37.7 percent solids, 8.5 parts of a styrenated tertiary butyl phenol, antioxidant and 425 parts of a 60 percent solids content naphthenic extender oil were preblended to give an oil extended rubber emulsion containing 50 parts extender oil for each 100 parts of rubber.

To a Patterson-Kelly liquid solids blender of the V-type, 205 parts of Silanox 101, a trade name of The Cabot Company for a Silane treated fumed silicon dioxide and 325 parts of HiSil 233, a trade name of Pittsburgh Plate Glass Company for a fine particle precipitated silicon dioxide, was added and blended. With the blender rotating, 2995 parts of the oil extended rubber emulsion was added slowly through the rotating liquid dispenser. The rotation was continued until the emulsion was converted into a free-flowing solid. The free-flowing solid was dumped into a shallow open pan and dried on top of a hot air oven (35°C.) until the water content reached less than one to two percent level.

The dry powder was placed in a fluidized bed apparatus and sufficient dry air, at 20° to 35°C. passed through the dry powder to form a fluidized bed. The air effluent from the bed was passed through filter bags to collect the fines. The fines corresponded in nature to the Silanox 101 and about 90 to 98 percent was collected. The collected fines could be reused to form more free-flowing powder from an emulsion by the above method where fines are used in lieu of part or all of the Silanox 101.

The material remaining in the floating bed after removal of the fines was discrete particles of oil extended rubber coated with mostly HiSil 233. Where the rubber is oil extended, usually about 25 to 100 percent more HiSil 233 is required to give a free-flowing nontacky powder. Analysis of the oil extended rubber powder showed it to contain 25+ parts of HiSil per 100 parts of rubber hydrocarbon. Also, where the latex is one containing a potassium or sodium soap of the fatty acids, less precipitated silica and hydrophobic silica usually is needed.

EXAMPLE II

In a Patterson-Kelly liquid-solids blender of the V-type, 205 parts of Silanox 101 and 225 parts of HiSil 233 were blended and then 2500 parts of a butadiene-acrylonitrile latex of 46 percent solids was added slowly through the rotating liquid dispenser to form a finely divided particulate crumb. This crumb was dried in a stream of low velocity dry warm air and then filtered through a 200 mesh U.S. Standard Screen to separate the Silane treated fumed silica from the elastomer particle. The finely divided particles passing the 200 mesh screen was reused to form more powdery crumb from a latex, which contained 11 parts of HiSil per 100 parts of rubber hydrocarbon.

The hydrophobic fumed silicon dioxide crumbing or powdering agents are prepared by treating silicon dioxide with a Silane such as the lower trialkyl Silanes or an alkylhalo Silane such as trimethyl Silanes are dimethyl dichlorosilane. It is preferred that each particle of silicon dioxide contain a monolayer of the organic silicon coating and such a monolayer of the coating would consist of $2 \times 10^{12}$ primary particles per square centimeter. The Silanes useful for treating the silica is represented by the polyalkyl Silanes and the polyalkyl halosilanes where the alkyl radical contains from one to 12 and preferably one to six carbon atoms with the methyl and ethyl radicals being preferred. The halo radical can be selected from the group of chloro, bromo and iodo. Representative polyalkyl halosilanes are trimethyl chlorosilane and dimethyl dichlorosilane. Hydrophobic silicas are available commercially from Philadelphia Quartz, Cabot Company and Dyussa Company. Some of the trade names their products are sold under are Silanox and Aerosil R972. The hydrophobic fumed silicon dioxide are made by hydrolysis of silicon dioxide which is then coated with a Silane or halosilane to give a silica containing from 0.5 to 4.0 percent carbon with the preferred range being one to 3.5 percent. The precipitated silicas are made by treating sodium silicate or water glass to precipitate out the hydrophilic form of silica and then heating to obtain the dry anhydrous finely divided silicon dioxide. A typical precipitate such as HiSil 233 or 215 has properties as follows:

| | |
|---|---|
| $SiO_2$ | 87 percent |
| Particle size | 0.022 Micron |
| Surface area (BET) | 140 M²/gram |
| Free moisture | 6 percent |
| Bound Moisture | 4.5 percent |
| pH (5% aqueous) | 7.1 |

The range of hydrophobic silicon dioxide is 4 to 80+ parts and preferably 6 to 10 parts based on 100 parts of the latex as a liquid and likewise the range of precipitated silica is 5 to 60, with the preferred range being 6.5 to 25 parts per 100 parts of rubber composition. The hydrophobic silicon dioxide and precipitated silica can be blended together over a wide range but the ratio of 15 to 70 percent of hydrophobic silicon dioxide is most readily utilized with approximately 40 to 60 percent being preferred.

The useful silicas are of very fine particle size, usually less than 100 mesh and preferably 200 mesh or less. A number of materials that can be used are as follows:

The material sold as Aerosil R972 is stated to have an average particle size of 20 millimicrons and is described as a micronized silica made hydrophobic by silicones. It is believed that the silicones are absorbed or coated onto the surface of the silica particles. The material is described as a hydrophobic highly dispersed silica acid powder. One gram of the material is stated to contain $3 \times 10^{17}$ primary particles and thus has a very large surface area believed to be in excess of 200 square meters per gram and as much as 400 square meters per gram. A four percent by weight dispersion is a one to one methanol water blended exhibits a pH of 3.6 to 4.0.

The preparation and properties of the Aerosil R972 are given in detail in the article by Brunner and Schutte in "Chem-iker-Zeitung/Chemische Apparatur" 89 (1965) 437–440, which states that this material is made by reacting silica (having silanol groups) with dimethyl dichlorosilane and steam in a fluidized bed reactor (Fr. Pat. No. 1,368,765; DAS No. 1,163,784). The article also states that the surface area of the resulting hydrophobic silica particles is determined by the Brunauer, Emmet and Teller nitrogen adsorption method, the specific area is found to be $120 \pm 30$ m²/g; it also states that the chlorine content is $0.04 \pm 0.01$ percent, which indicates that at least part of the acidity of the silica may be due to small amounts of residual HCl dispersed on the surfaces of the silica particles.

A material sold as Santocel 54 and materials sold as Aerosil A200 and Aerosil A300 may be used. These materials are all fumed silicas made, for example by the high temperature hydrolysis of a silicon halide such as silicon tetrachloride. See, for instance, the article on "Silica;(amorphous)" in the Encyclopedia of Chemical Technology Volume 18 (second edition, 1969) page 67; the article on "Aerosil..." by Wagner and Brunner in Angew. Chem. 72 (1960) pages 744–750; and the article on "Pyrogenic Oxides of silicon and aluminum" in the book "Ultrafine Particles" (ed. Kuhn, Lamprey, Scheer) published 1963 by John Wiley pages 196–205. The pH of an Aerosil in 4 percent aqueous dispersion is typically about 3.8 (see page 747 of the Watner and Brunner article) and it has less than 0.025% HCl, measured by argentometric titration.

Another suitable acidic silica is the material known as "Gasil 644," which is a micronized silica gel which has been impregnated with magnesium silicofluoride and which has a particle size of about 3 to 5 microns and a pH (measured in 4 percent aqueous suspension) of about 2.2. It is believed that this material is prepared by the process described in German Pat. No. 957,775 of Feb. 7, 1957. This particular silica is the discovery of David Price.

It is preferred that the wet rubber hydrocarbon powder be dried at as low temperature as possible to prevent scorching the rubber hydrocarbon. Thus, temperatures of 35°C. to 100°C. should be satisfactory. Also, if the wet powder is agitated vigorously, by mechanical or moving gas, it should be appreciated this causes loss of the hydrophobic silica.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a dry powdery plastic or elastomer composition comprising adding with intimate mixing a fine stream of a latex of a plastic or elastomer composition in a partitioning agent comprised of a powdery hydrophobic silica to obtain a wet free-flowing particulate mass, and drying the wet particulate mass to obtain a powder.

2. The method of claim 1 wherein the partition agent is a blend of hydrophobic silica and precipitated silica in the ratio of 15 to 70 percent.

3. The method of claim 2 wherein at least 90 percent of the hydrophobic silica is recovered from the dry powder.

4. The method of claim 3 wherein the recovered hydrophobic silica is used to treat more latex.

5. The method of claim 1 wherein the latex contains an alkali soap of a fatty acid as the emulsifying agent.

6. The method of claim 5 wherein the alkali soap is a sodium or potassium soap.

7. The method of claim 1 wherein the plastic or elastomeric composition is a solid over the temperature range of 20° to 50°C.

8. The method of claim 1 wherein a hundred parts of latex is used to 4 to 80 parts of hydrophobic silicon dioxide.

9. The method of claim 1 wherein 5 to 60 percent of precipitated silicon dioxide is used in conjunction with the hydrophobic silicon dioxide.

* * * * *

UNITED STATES PATENT OFFICE
CERTIFICATE OF CORRECTION

PATENT NO. : 3,907,734

DATED : September 23, 1975

INVENTOR(S) : Theodore R. Ten Broeck and Raymond E. Downey

It is certified that error appears in the above-identified patent and that said Letters Patent are hereby corrected as shown below:

Column 4, line 2, change "is" to -- in --;
Column 4, line 3, change "blended" to -- blend --;
Column 4, line 44, change "German Pat. No. 957,775" to
-- German Pat. No. 957,755 --.

Signed and Sealed this thirtieth Day of December 1975

[SEAL]

Attest:

RUTH C. MASON
*Attesting Officer*

C. MARSHALL DANN
*Commissioner of Patents and Trademarks*